(12) United States Patent
Hansen et al.

(10) Patent No.: US 7,794,779 B2
(45) Date of Patent: Sep. 14, 2010

(54) METHOD OF MANUFACTURING GAS DIFFUSION ELECTRODES

(75) Inventors: Neils Richard Stewart Hansen, Poole (GB); Richard Alan Sellis, Waterlooville (GB); John Chapples, Drayton (GB)

(73) Assignee: Honeywell Analytics Ltd., Poole, Dorset (GB)

(*) Notice: Subject to any disclaimer, the term of this patent is extended or adjusted under 35 U.S.C. 154(b) by 757 days.

(21) Appl. No.: 10/552,497

(22) PCT Filed: Apr. 7, 2004

(86) PCT No.: PCT/GB2004/001529

§ 371 (c)(1),
(2), (4) Date: Sep. 8, 2006

(87) PCT Pub. No.: WO2004/091019

PCT Pub. Date: Oct. 21, 2004

(65) Prior Publication Data

US 2007/0036889 A1 Feb. 15, 2007

(30) Foreign Application Priority Data

Apr. 7, 2003 (GB) ................................. 0308008.2

(51) Int. Cl.
*B05D 5/12* (2006.01)

(52) U.S. Cl. .................. 427/58; 427/115; 427/120; 427/125

(58) Field of Classification Search .................. 427/58, 427/115, 120, 125
See application file for complete search history.

(56) References Cited

U.S. PATENT DOCUMENTS

| | | | |
|---|---|---|---|
| 3,663,303 A | 5/1972 | Dietz | |
| 5,521,010 A | 5/1996 | Dhar | |
| 5,618,392 A * | 4/1997 | Furuya | ........................ 204/252 |
| 5,935,643 A * | 8/1999 | Song et al. | ................... 427/115 |
| 2002/0134501 A1 * | 9/2002 | Fan et al. | .................. 156/308.2 |

FOREIGN PATENT DOCUMENTS

| | | |
|---|---|---|
| DE | 35 32 286 | 4/1987 |
| EP | 0 641 033 | 3/1995 |
| WO | WO-01/18894 A2 | 3/2001 |
| WO | WO-01/18894 A3 | 3/2001 |

OTHER PUBLICATIONS

PCT Written Opinion dated Aug. 26, 2005.
International Search Report dated Aug. 26, 2005.
British Search Report dated Aug. 29, 2003.

* cited by examiner

*Primary Examiner*—Binh X Tran
(74) *Attorney, Agent, or Firm*—Husch Blackwell Sanders Welsh & Katz

(57) ABSTRACT

A process is described for manufacturing gas diffusion electrodes, which process comprises: (a) treating an area of a pre-shrunk porous hydrophobic substrate so as to restrict the slurry deposited in step b) to the said area, preferably by forming a well in the area and/or treating the substrate in the area to render it less hydrophobic, e.g. by plasma treating the area; (b) dispensing a slurry of catalyst onto the said area, (c) removing liquid from the dispensed slurry, (d) treating the dried slurry to remove organic materials and e) cutting the catalyst and the underlying portion of substrate from the rest of the substrate.

16 Claims, 2 Drawing Sheets (1)
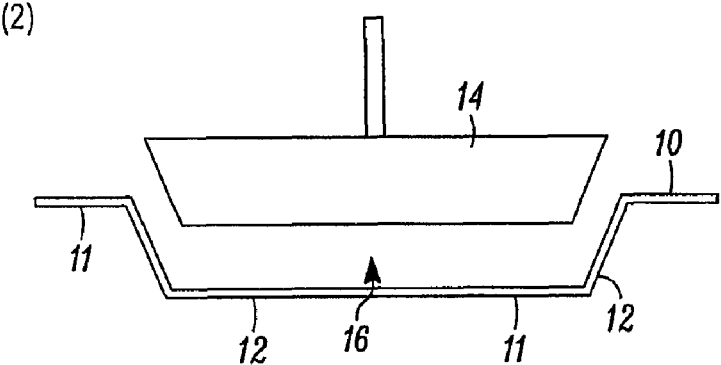
FIG. 1
(2)
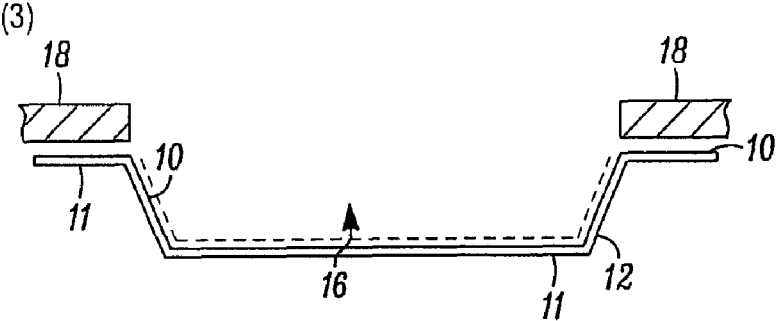
FIG. 2
(3)
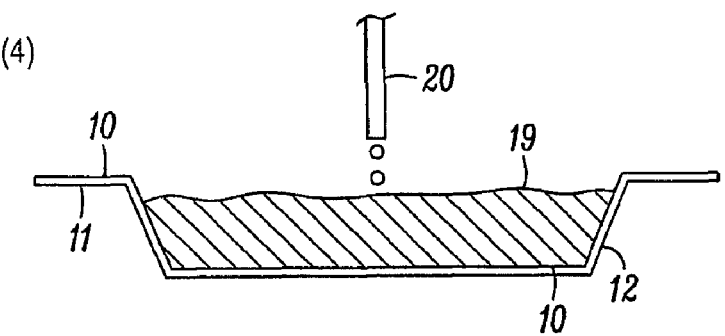
FIG. 3
(4)
FIG. 4

METHOD OF MANUFACTURING GAS DIFFUSION ELECTRODES

CROSS REFERENCE TO RELATED APPLICATION

The present application is the U.S. national stage application of International Application PCT/GB2004/001529, filed Apr. 7, 2004, which international application was published on Oct. 21, 2004 as International Publication WO 2004/091019. The International Application claims priority of British Patent Application 0308008.2, filed Apr. 7, 2003.

FIELD OF THE INVENTION

The present invention relates to a method of manufacturing gas diffusion electrodes, for use, for example, in gas sensors or fuel cells or other applications where gas diffusion electrodes are utilised.

BACKGROUND OF THE INVENTION

Gas diffusion electrodes are well known and consist of a hydrophobic substrate layer, usually of PTFE, on one surface of which there is deposited a catalytic layer of controlled wettability. The side of the hydrophobic substrate containing the catalyst is placed in contact with an aqueous electrolyte; the other side is in contact with a gas. Gas, e.g. oxygen, can diffuse through the porous PTFE sheet and come into a contact with the catalyst wetted with electrolyte, where it can react electrochemically. Current from the reaction can be drawn from the electrode using a current collector.

Gas diffusion electrodes are made by several routes:

1) A slurry containing catalyst powder and small PTFE particles is dispensed into a well formed in a sacrificial medium, e.g. a foil. The use of a well allows the slurry to contain a high proportion of suspending liquid, e.g. water, which improves the accuracy of the amount of catalyst dispensed and also reduces the tendency of the catalyst to coagulate. A surfactant may be included in the slurry to reduce the tendency of the catalyst to coagulate. The dispensed slurry in the cavity is then dried by driving off the water (or other low boiling point carrier solvent) via low temperature oven cycles. The dried electrode is then cured at high temperatures to decompose organic stabilisers and thickeners, e.g. surfactants and polymers. If heated too quickly, the surfactants can combust, causing a sharp increase in temperature, which damages the electrode and can render it useless. Accordingly, tightly controlled heating rates are critical to the production of consistent electrodes. Once all the organic stabilisers have been decomposed, the catalyst is transferred to a PTFE tape by laying the tape across the top of the cavity containing the catalyst and the tape and the foil carrier are lightly pressed together between two flat surfaces and then transported to a press where they are subjected to a large pressure for a controlled amount of time. The foil is then peeled away, leaving the catalyst on the PTFE.

A disadvantage of the above process is that the controlled temperature regime required makes this process long drawn out and therefore expensive. Also, the transfer of the catalyst from the foil to the PTFE tape is often imperfect with some of the catalyst sticking to the foil. Additionally, the foil material can poison the catalyst, possibly alloying with the catalyst metal or leaving metal residues which may affect the catalyst activity.

2) Gas diffusion electrodes can be produced by screen printing a catalyst-containing ink onto a PTFE sheet. The rheology of the ink is critical. Unfortunately, because the ink is exposed to air during the screen printing process, it can dry out, which changes the rheology of the ink. Furthermore, the ink will contain substantial quantities of organic surfactants which must be decomposed by complex thermal treatment. If the temperature of the thermal treatment is too high, the surfactants will combust and the heat given out by the combustion will damage the electrode by localised thermal modification of the porous PTFE substrate. If the organic surfactants are left in, this will compromise the performance of the electrode by reducing the hydrophobicity of the substrate.

After screen printing, the deposit is pressed to form the final electrode.

3) The catalyst can be spray deposited onto a substrate through a mask. The substrate can be a sacrificial substrate. The required catalyst area is punched out from the sprayed substrate and the catalyst is transferred to a PTFE substrate using pressure as described in method 1) above. The disadvantages of this method are similar to those described above in connection with method 1).

4) The catalyst can be directly sprayed onto a sacrificial carrier, using a mask to create the desired electrode shape, and the catalyst deposit subsequently transferred to the PTFE substrate. This process has the same disadvantage and advantages as catalyst transfer mentioned in method 1) above and many of the disadvantages of screen printing in method 2); it has the additional drawback of providing lower catalyst utilisation because a high percentage of the catalyst-containing liquid is deposited onto the mask.

It will be appreciated that the accurate deposition of a precise dose of catalyst is essential to the manufacture of these gas electrodes since the catalyst is generally expensive (e.g. platinum) and since the amount of catalyst affects the performance of the electrode in that a catalyst loading that varies from electrode to electrode can give rise to different outputs, which is problematic when the electrodes are used for quantitative measurement, e.g. in gas sensors.

The present invention provides a process that provides consistent electrodes with low wastage of expensive catalyst and that is readily subject to mechanisation.

SUMMARY OF THE INVENTION

According to the present invention, there is provided a process for manufacturing a gas diffusion electrodes, which process comprises:

(a) treating an area of a pre-shrunk porous hydrophobic substrate so as to restrict slurry deposited in step b) to that area,
(b) dispensing a slurry of catalyst onto the area,
(c) removing liquid from the dispensed slurry, and
(d) treating the dried slurry to remove organic materials.

As used herein the term "slurry" is intended to denote catalyst suspended in a liquid, preferably an aqueous liquid, and is not intended to imply anything about the tendency of the catalyst to settle out, although it is preferred that the catalyst will remain in suspension under moderate stirring and with the addition of water-soluble thickeners, e.g. modified cellulose-based polymers, which increase the viscosity of the slurry and slow the rate of catalyst sedimentation.

Preferably, the hydrophobic substrate is heat treated before the well is formed in order to remove inherent stresses in the substrate so that it will not deform during subsequent heat treatment during the manufacturing process. This pre-treatment should take place at a temperature equal to or greater than that experienced during the subsequent manufacturing process and is typically between 280 to 310° C. During the heat pre-treatment, the substrate should not be constrained by its sides in any way but should merely be supported by a flat surface. After pre-treatment, internal stresses within the substrate have been removed and thus, when reheated during the subsequent process, the substrate is thermally stable and stays flat.

Step a) preferably comprises (i) forming a well at the said location of the hydrophobic substrate and/or (ii) surface treating the hydrophobic substrate to render the substrate less hydrophobic in the said area where the electrode is to be formed. If both (i) and (ii) are carried out, they can be carried out in either order, i.e. the hydrophobic substrate may be surface treating to render the substrate that is in the well or is destined to be within the well less hydrophobic.

The well in the hydrophobic layer can be formed by a simple pressing operation, although care should be taken not to induce excessive stress in the hydrophobic layer during the pressing process. The well can be formed by placing a pre-shrunk hydrophobic PTFE substrate over a support/former, made for example, of inert metal and having a recess. The substrate can then be pressed into the recess to form the well using an embossing head covered with resilient material, e.g. rubber or foam. The support/former may then be used to support the hydrophobic substrate during subsequent process steps, which has the advantage that, during heat treatment, it provides shielding against thermal shock and also provides a thermal sink to remove heat if the temperature at parts of the electrode rise excessively.

The surface modification step a)ii) reduces the hydrophobicity of the substrate in the areas where the catalyst slurry is to be deposited. This allows the aqueous slurry to form a coherent deposit without beading up excessively. If only the area within the well is surface treated, then the hydrophobic nature of the substrate outside the treated area will help prevent the slurry from flowing over it and so will help retain the slurry in the treated area, thereby confining the slurry to the well. This confinement is especially beneficial during transport of the well and slurry, e.g. to an oven, since the slurry will have a reduced tendency to spill over the edges of the well when jerked, because of the more hydrophobic nature of the substrate outside the well. A further significant advantage of surface treatment is a lowering of the requirement for surfactant within the slurry. If no well is formed, the difference in the hydrophobic surface properties between the substrate in the area that has been surface treated and the substrate outside the area that has not been treated, will confine the slurry to the area.

Any process that increases the surface energy of the hydrophobic layer is acceptable. Preferred surface treatments include corona discharge treatment, plasma discharge treatment. Although surface treatment could be achieved by deposition of a surfactant onto the surface, this is not preferred since it increases the organic content of the electrode, which must be removed during a subsequent heat curing process, which must be tightly controlled to prevent the exothermic combustion of the surfactant that could damage the electrode.

In step b), the slurry is dispensed onto the substrate using any suitable means. We prefer to dispense the slurry through a nozzle, feeding the slurry from a sealed reservoir; the use of a sealed reservoir prevents the slurry drying out during the process. The slurry may be stirred inside the reservoir to maintain a uniform catalyst distribution within the slurry.

The viscosity of the liquid in the slurry should not be too low or else the catalyst will readily settle out in the reservoir and it will be difficult to achieve consistent doses of catalyst. On the other hand, the viscosity of the slurry should not be too high or else the deposited slurry will not coalesce into a coherent pool within the well/surface treated area.

After the slurry has been dispensed, the well containing the slurry is treated (step c)) to remove the liquid of the slurry, generally by evaporation. Alternatively, in step (c), the liquid may be removed by solidifying the liquid. Thus, the liquid may be reactive, e.g. polymerizable, in which case the liquid can be removed by polymerising the liquid to form a solid. For example, the liquid could be a styrene primer that reacts to form polystyrene. The solidified liquid may be heated in step d) to remove it. In the case of polystyrene, it will "unzip" (the cross linked bonds in the polymer will break), when heated to a temperature above 120° C. and the resulting styrene primer will then evaporate. Alternatively, the liquid in the slurry could have a melting point above ambient temperature and the slurry could be dispensed at an elevated temperature above the melting point. The liquid in the slurry will solidify as it cools to ambient temperature. The solidified liquid can then be removed in step d), e.g. by evaporation. The heat treatment in step d) should remove some or substantially all the organic materials within the slurry. As mentioned above, because the hydrophobic substrate has already been heat treated before the slurry is deposited, heat treatments to remove liquid and organic material do not shrink the substrate further. The surface treatment (Step a)ii)) reduces the amount of organic material required for the slurry and so simplifies and shortens the heating stage and also reduces the risk of damage to the electrode due to combustion of the organic materials.

The process preferably also comprises:
(e) cutting the catalyst deposit and the underlying portion of the substrate from the rest of the substrate to form an electrode comprising a porous and conductive catalyst mass supported on the portion of the substrate.

Before and/or after cutting the electrode out, it will generally be desirable to press the electrode in order to improve mechanical adhesion between the catalyst deposit and the PTFE substrate (described as "keying in" of the catalyst). In addition, the pressing will have the effect of flattening the electrode, particularly if a well in the substrate is formed as part of the manufacturing process; such flattening makes subsequent processing operations simpler.

The hydrophobic substrate is preferably PTFE.

The catalyst slurry preferably contains a surfactant, e.g. a water-soluble non-ionic surfactant, that will retain the catalyst in the suspension and will burn off well during subsequent heat treatment. Thus, Triton X is preferred; but other surfactants may also be used.

BRIEF DESCRIPTION OF THE DRAWING

A process according to the invention will now be described, by way of example only, by reference to the accompanying schematic drawing of the process.

FIGS. 1-7 depict a series of process steps and apparatus associated with those process steps in accordance with an illustrated embodiment of the invention.

DESCRIPTION OF THE PREFERRED METHOD OF PUTTING THE INVENTION INTO EFFECT

Figure 5:
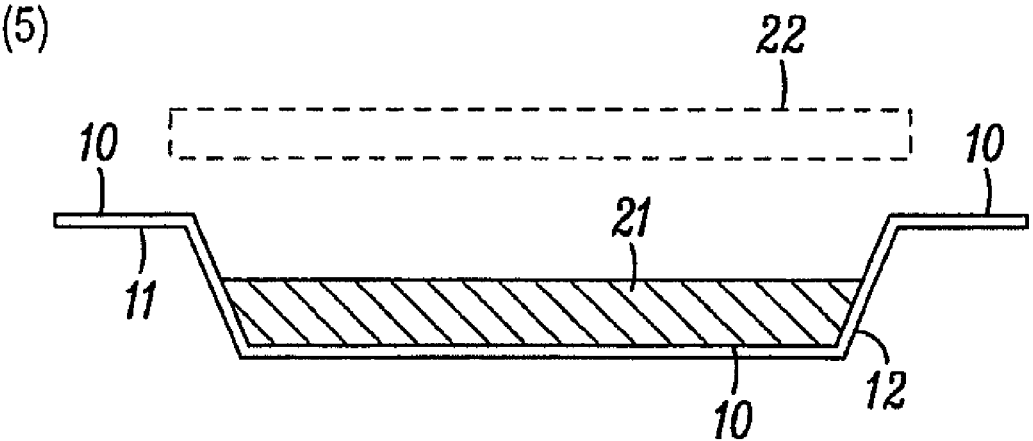
Figure 6:
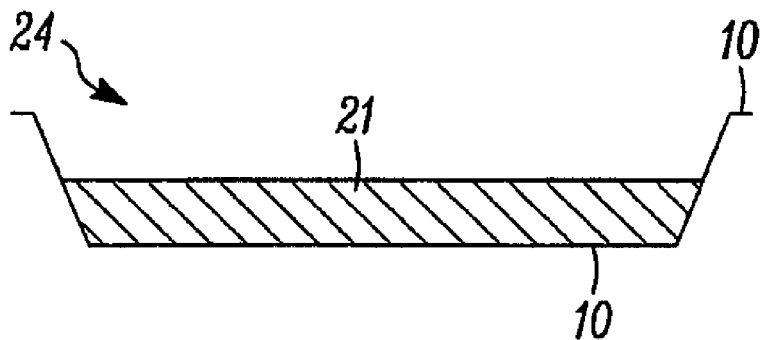
Figure 7:
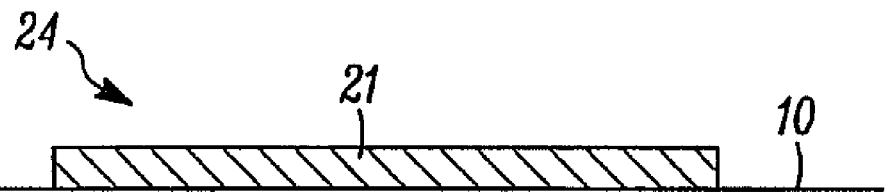

A microporous hydrophobic PTFE sheet 10 is heat treated—see step (1) depicted in the accompanying drawing—by laying it on a flat surface and exposing it in an oven to a temperature between 280 to 310° C. so as to provide uniform heating of the PTFE layer for sufficient time to allow the PTFE to shrink uniformly. The oven temperature is chosen to be higher than the temperatures that the PTFE layer will be exposed to in any subsequent manufacturing procedures or in use to ensure that no further shrinkage in the PTFE sheet 10 occurs. Generally, this shrinkage stage will take place in about 30 minutes following the PTFE attaining the oven temperature.

Although the PTFE layer will generally be microporous, some gas electrodes react with dissolved gases and accordingly the PTFE substrate need not, in those circumstances, be microporous. However, it is generally convenient to use microporous PTFE substrates even when acting on dissolved gases to avoid having to make separate porous and non-porous electrodes.

The PTFE substrate can be obtained from W. L. Gore and Associates (UK) Ltd Kirkton South Road, Kirkton Campus, Livingston, West Lothian EH54 7BT and will have a thickness appropriate for the application of the electrode.

If the PTFE layer is placed on a flat surface during the above pre-shrinkage procedure, it will generally retain its flat shape and it will not be necessary to flatten it.

The pre-shrunk PTFE layer 10 is then placed over a female former 11 (see step (2) of the drawing) that includes a cavity 12 of approximately the same volume as the volume of catalyst slurry that it is intended to dispense in a subsequent step (see below). A rubber or foam head 14 is then brought down on the sheet 10 with a force of approximately 325 N applied over the 3 mm diameter cavity to urge the sheet into the cavity 12 to form a well 16 in the PTFE sheet 10.

In step (3), a mask 18 is placed over the rim of the well 16 and the area of the sheet 10 within the well 16 is treated by a plasma or corona discharge head to modify the surface of the PTFE sheet within the well (as shown schematically by dotted lines in step (3)). The precise conditions of the surface treatment will depend on the nature of the PTFE layer but the treatment should be such as to increase the surface energy by at least 10 to 15 dynes/cm$^2$, e.g. from less than 20 dynes/cm$^2$ to greater than 34 dynes/cm$^2$.

Because of the use of the mask 18, the surface treatment only extends as far as the rim of the well and accordingly the material above the rim is not surface treated and so is more hydrophobic than the PTFE sheet within the well.

In step (4), an aqueous slurry of catalyst 19 is dispensed from a closed container (not shown) equipped with a stirrer. The slurry will generally contain approximately 10 to 25% by weight of the catalyst, but the catalyst loading can generally be varied over a wide range, according to other process variables. The catalyst may be, for example, platinum having a typical mean particle diameter distribution of 6 to 12 μm, as measured by a Malvern light-scattering analysis on an aqueous suspension of catalyst powder. Different catalyst particle sizes can be used to optimise the electrode performance, although an upper limit is imposed on the size of the catalyst particles by the need to keep the particles in suspension prior to being dispensed into a well. Catalyst particle suspension can be improved to a certain extent by stirring, by adjusting the viscosity of the slurry, i.e. adding more thickener, and by adding a surfactant. 90% of the catalyst particles should preferably have a particle diameter of <32 μm. The preferred surfactant is Triton X and the preferred thickeners are modified cellulose polymers, e.g. methyl, ethyl, propyl and hydroxypropyl methyl cellulose compounds. Typically the slurry will contain ≦1% w/w of thickeners. The amount of surfactants and thickeners should be kept to the minimum amount feasible to keep the slurry catalyst in suspension under the conditions prevailing in the slurry reservoir since they need to be removed, by heat treatment, after the deposition of the slurry into the well (see below).

The deposition of the slurry (step (4)) can take place using any suitable technique, for example via a syringe 20 (as shown) or by spraying, printing or writing techniques.

The slurry is aqueous but will not bead-up within the well as a result of the surface treatment in step (3) above and the inclusion of the small amount of surfactant in the slurry; the slurry will thus wet the walls of the well. However, because the PTFE sheet 10 outside the well has not been surface treated, the slurry will not readily flow out of the well, e.g. if jolted during transport of the slurry-filled wells.

The PTFE sheet 10 with its slurry-filled well is then transported to an oven where it is heat treated firstly to evaporate the water and then, at a higher curing temperature, to decompose organic materials (thickeners and surfactants) within the slurry. A typical temperature would be as follows:

Drying: 80-85° C. for ten minutes to drive off approximately 35 μl of water per well.

Curing: Ramp from 80° C. to 290° C. at 5° C.min$^{-1}$ and hold at 290° C. for eighty minutes. This is significantly shorter than previous curing processes for slurries, which contain higher surfactant concentrations.

The well 16, after heat treatment, is shown at step (5) in the accompanying drawing and during step (5), a ring stamp 22 is used to stamp out an electrode 24 shown at (6). The electrode is then removed from the cavity 12 and lightly pressed (step (7)) in order to improve mechanical adhesion between the catalyst deposit and the PTFE substrate. The pressing also flattens the electrode, which makes subsequent processing operations simpler. A typical press would use machined steel pressing plates with a surface layer approximately 5 mm thick of 70-90 Shore (Scale A) hardness rubber to apply a force of approximately 600-900 N per 17 mm diameter electrode press head.

The advantage of the process of the present invention lies in the combination of the direct deposition of the catalyst onto the electrode substrate together with confining the deposit to a specific location either by the use of a well or the surface treatment of the substrate or both. The plasma treatment has the advantage that it reduces the requirement for the surfactant to form a uniform catalyst deposit on the hydrophobic substrate. Because less surfactant is used, its removal is easier. In addition, because the surface onto which the catalyst is deposited is more hydrophilic/less hydrophobic than the surrounding area, the catalyst deposited tends to be retained within the treated area and the use of a well assists in this regard. The retention of the catalyst deposit within a pre-defined area allows the substrate to be moved with the catalyst slurry during manufacture without spillage, which would affect the shape of the final electrode, and so allows ready automation of the process. The direct deposition of the catalyst onto the substrate of the electrode without the use of intermediate transfer sheets also simplifies production.

We have found that it is possible to operate the above process by restricting the slurry using one or other of the well and the surface treatment and that it is not necessary to use both but the use of both is preferred.

The invention claimed is:

1. A process for manufacturing gas diffusion electrodes, which process comprises:
    a) treating a restricted area of a pre-shrunk porous hydrophobic substrate wherein said area is less hydrophobic than a surrounding area of said substrate,
    b) dispensing a slurry of catalyst onto the restricted area, the slurry of catalyst further comprises organic materials, c) removing liquid from the dispensed slurry to dry the slurry, and d) treating the dried slurry to remove organic materials.

2. A process as claimed in claim 1, wherein step c) comprises heating the slurry to evaporate the liquid.

3. A process as claimed in claim 1 wherein step d) comprises heating the dried slurry to a temperature sufficient to decompose the organic materials.

4. A process as in claim 1, where step c) is achieved by solidifying the liquid.

5. A process as claimed in claim 1, which includes pre-shrinking the hydrophobic substrate by heat treatment at a temperature greater than that used in either of steps c) or d).

6. A process as claimed in claim 1, which includes a further step of: e) cutting the catalyst deposit and the underlying portion of substrate from the rest of the hydrophobic substrate to provide a porous and conductive catalyst mass supported on the said portion of the substrate.

7. A process as claimed in claim 1, wherein the hydrophobic substrate is PTFE.

8. A process as claimed in claim 1 wherein (c) and (d) steps are performed in a single step.

9. A process as in claim 1 wherein step a) comprises further comprising forming a well at the said area in the pre-shrunk porous hydrophobic substrate to form said restricted area.

10. A process as in claim 9 which comprises forming said well after treating the restricted area to render the well relatively less hydrophobic than an area surrounding the well.

11. A process for manufacturing gas diffusion electrodes comprising:

a) heat treating a microporous hydrophobic PTFE sheet to a temperature between 280 to 310° C. to form a pre-shrunk porous hydrophobic substrate, b) forming a well area in said heat treated PTFE sheet, c) treating the well area to increase the surface energy of the well area by at least 10 to 15 dynes/cm2 so that said well area is less hydrophobic than a surrounding area of said PTFE sheet, d) dispensing an aqueous slurry of catalyst into the treated well area the aqueous slurry comprises organic materials, e) drying the aqueous slurry to remove water and dry the slurry, and f) curing the dried slurry to remove organic materials.

12. The process of claim 11 which further comprises stamping the cured dried slurry to provide an electrode, removing the electrode from the well and lightly applying a relatively light pressing force to opposing sides of the removed electrode to improve mechanical adhesion.

13. The process of claim 11 wherein the slurry contains about 10 to 25% by weight of the catalyst, the slurry is dried at a temperature of 80-85° C. for about 10 minutes, and is cured by raising the temperature from the drying temperature at 5° C. per minute until it reaches 290° C. and is held at 290° C. for about 80 minutes.

14. The process of claim 13 which further comprises stamping the cured dried slurry to provide an electrode, removing the electrode from the well and lightly pressing the removed electrode with a force of about 600-900 N per 17 mm.

15. A gas diffusion electrode which has been prepared by providing a pre-shrunk microporous PTFE substrate with a confined area that is less hydrophobic than a surrounding area of said substrate, dispensing an aqueous catalyst slurry in the confined area, and heating the slurry and the PTFE substrate in the confined area to dry the slurry.

16. The gas diffusion electrode of claim 15 wherein the confined area is plasma treated prior to the slurry being dispensed, said slurry contains about 10 to 25% by weight of a catalyst, the slurry is dried at a temperature of 80-85° C. for about 10 minutes, and is cured by raising the temperature from the drying temperature at 5° C. per minute until it reaches 290° C. and is held at 290° C. for about 80 minutes, stamping the cured dried slurry to provide an electrode, removing the electrode from a support and applying a relatively light pressing force to opposing sides of the removed electrode to improve mechanical adhesion.

* * * * *